United States Patent [19] [11] 3,984,226
Garthus et al. [45] Oct. 5, 1976

[54] FERTILIZER CONCENTRATE

[75] Inventors: Donald R. Garthus, Perrysburg; Melvin T. Wygant, Toledo, both of Ohio

[73] Assignee: Interlake, Inc., Chicago, Ill.

[22] Filed: Feb. 24, 1975

[21] Appl. No.: 552,135

[52] U.S. Cl. ................................. 71/61; 71/63; 71/64 C; 423/550
[51] Int. Cl.² ......................................... C05C 3/00
[58] Field of Search ............... 71/1, 31, 54, 61, 63, 71/64 C; 423/237, 238, 549, 550

[56] References Cited
UNITED STATES PATENTS

| 952,560 | 3/1910 | Caro | 423/550 |
|---|---|---|---|
| 2,595,104 | 4/1952 | Schulte | 423/550 |
| 2,862,789 | 12/1958 | Burgess | 423/550 |
| 2,966,394 | 12/1960 | Van Ackeren | 423/550 |
| 3,408,157 | 10/1968 | Miller | 423/550 |

*Primary Examiner*—Charles N. Hart
*Assistant Examiner*—Ferris H. Lander
*Attorney, Agent, or Firm*—Prangley, Dithmar, Vogel, Sandler & Stotland

[57] ABSTRACT

A fertilizer concentrate and process for making same in which a sulfuric acid solution contacts an ammonia containing gas to produce a liquid non-crystalline ammonium sulfate. The reaction takes place in an absorber wherein the reactants are maintained at about 120°F., the outlet stream from the reactor being split into two streams, one of which is recycled to the absorber and the other of which is recycled to a circulation tank for sulfuric acid make-up. The weight percent of ammonium sulfate in the final solution is in the range of about 35% to about 42% by weight.

14 Claims, 1 Drawing Figure

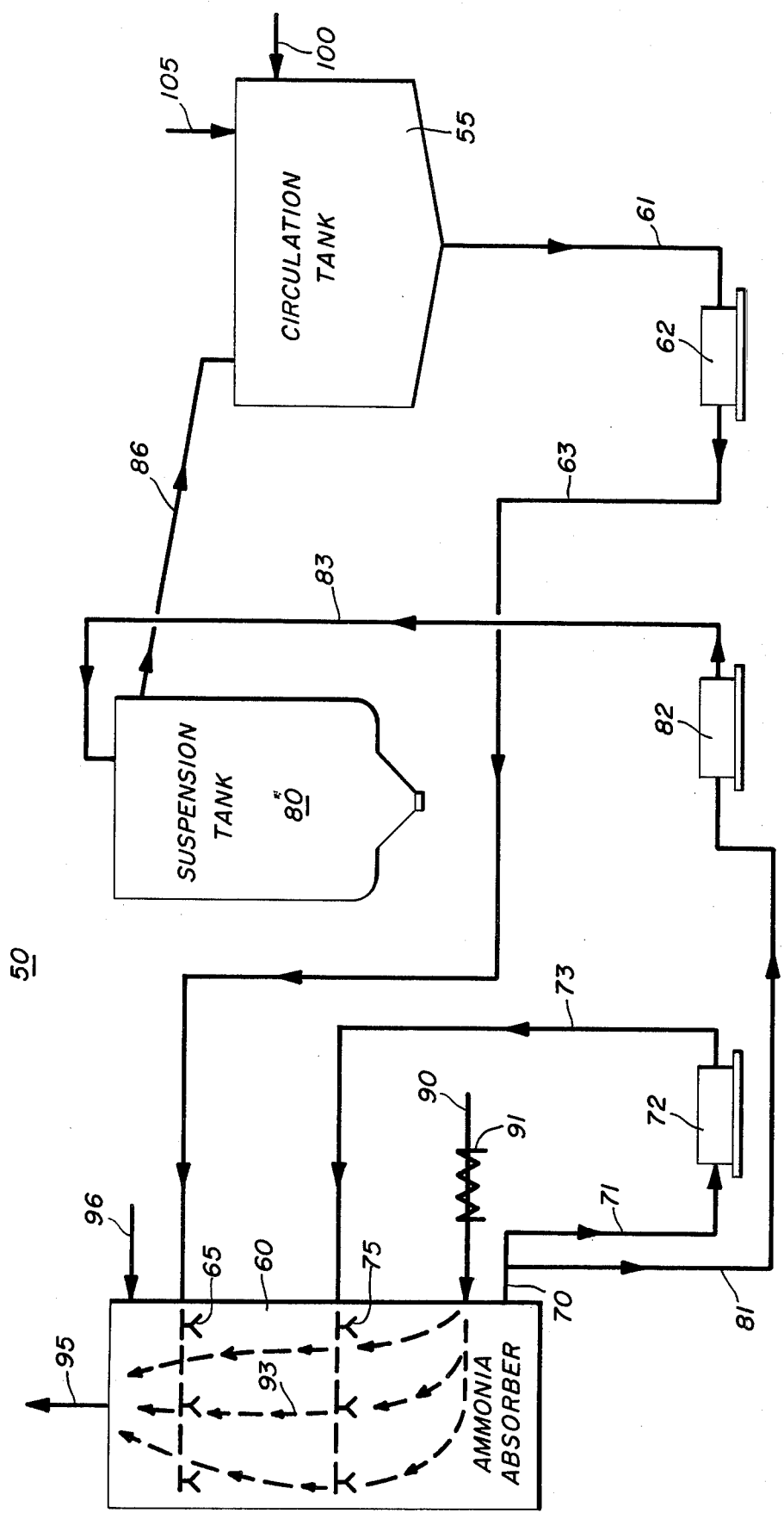

FERTILIZER CONCENTRATE

BACKGROUND OF THE INVENTION

Fertilizers are increasingly important in view of the world food shortage. Fertilizers containing both sulfur and nitrogen have been found to be advantageous over fertilizers containing only nitrogen.

In a steel making plant often gases from the coking operations contain quantities of ammonia gas which has been employed to make dry fertilizer. It also has been found that the ammonia in the coking gas can be advantageously used to produce an improved liquid fertilizer concentrate.

SUMMARY OF THE INVENTION

This invention relates to a fertilizer concentrate and process for making the same in which a sulfuric acid is contacted with an ammonia containing gas to produce a liquid non-crystalline fertilizer concentrate, and more particularly to a process in which the viscosity of the fertilizer concentrate produced is in the range of from about 25 to about 28 Baume at 60°F., and the ammonium sulfate concentration is in the range of about 36% and about 42% by weight.

It is an important object of the present invention to provide a fertilizer concentrate which is a liquid non-crystalline ammonium sulfate solution.

Another object of the present invention is to provide a process for producing a liquid non-crystalline fertilizer concentrate in which the process comprises providing a liquid non-crystalline fertilizer concentrate providing a sulfuric acid solution wherein the sulfuric acid is present in a range of from about 1.5% to about 10% by weight, contacting the sulfuric acid solution with an ammonia containing gas to produce liquid non-crystalline ammonium sulfate, maintaining the sulfuric acid in the solution in the range of from about 1.5% to about 10% by weight until the viscosity of the solution is in the range of from about 25 to about 28 Baume at 60°F., and thereafter contacting the resultant liquid solution with an ammonia containing gas until the acid content is reduced to less than about 1% by weight to produce a liquid non-crystalline ammonium sulfuric fertilizer concentrate.

Another object of the present invention is to provide a process of the type set forth wherein the ammonia containing gas and the sulfuric acid solution in contact therewith are maintained at a temperature in the range of from about 100° to about 130°F.

A further object of the present invention is to provide a process of the type set forth wherein the sulfuric acid solution containing liquid non-crystalline ammonium sulfate is split into a plurality of streams in which one stream is continuously contacted with the ammonia containing gas and the other stream is used to facilitate sulfuric acid make up.

BRIEF DESCRIPTION OF THE DRAWINGS

These and other objects of the present invention together with further objects and advantages thereof will best be understood by reference to the following specification and to the drawing in which the single FIGURE shows a schematic of a system for producing the fertilizer concentrate of the present invention.

PREFERRED EMBODIMENT OF THE PRESENT INVENTION

The system 50 for producing the fertilizer concentrate of the present invention includes a circulation tank or storage facility 55 connected to an absorber 60, the tank 55 having a bottom outlet pipe 61 connected to the suction side of a pump 62. A pipe 63 interconnects the pressure side of the pump 62 and the absorber 60 and enters the absorber 60 at a point near the top thereof. The pipe 63 is connected to a multiple outlet spray 65, the purpose of which will be hereinafter set forth.

The absorber 60 has a bottom outlet 70 which is split into two streams, one of which is connected via the pipe 71 to the suction side of a pump 72. The pump 72 is connected through a pipe 73 to the absorber 60 at a point below the pipe 63. The pipe 73 is connected to a multiple outlet spray 75 positioned inside the absorber 60, thereby providing vertically spaced apart sprays 65 and 75. The other stream from the outlet 70 flows through a pipe 81 to the suction side of a pump 82 and then to a suspension tank 80 through a pipe 83. The suspension tank 80 has no outlet at the bottom thereof and overflows to the circulation tank 55 through a pipe 86 which connects near the top of the suspension tank 80 and receives a liquid therefrom and directs it into the top of the circulation tank 55. It is apparent that the suspension tank 80 should be located vertically above the circulation tank 55 to facilitate the gravity feed from the suspension tank 80 to the circulation tank 55. While two tanks 55 and 80 have been shown in the drawing, it will be readily understood that a single tank large enough to accommodate the desired volume of liquid will suffice for the process.

An ammonia containing gas from a source 90 flows through a heater 91 into the absorber 60 near the bottom thereof. The gas flows upwardly as shown by the arrows 93 and exits at the gas outlet 95 positioned at the top of the absorber 60. The heater 91 may be steam, hot water or any other well known heating device. A second heater 96 is provided at the top of the absorber 60 and preferably is a steam injection heater which injects live steam into the absorber 60, all for a purpose hereinafter set forth. Finally, the circulation tank 55 is provided with a water inlet 100 and an acid inlet 105.

In operation, water is charged through the inlet 100 to the circulation tank 55. Sulfuric acid from a source thereof is added to the water in the circulation tank 55 until a predetermined quantity of acid is present in the water. Sulfuric acid may be present in the water in the range of from about 1.5% to about 10% by weight with 4.5 being a preferred weight percent of acid in the water solution. The acid may be added through the inlet 105 in concentrated form with a 66 Baume solution being preferred, but other concentrations are acceptable. The acid containing solution is pumped from the circulation tank 55 through the pump 62 into the absorber 60. When the absorber 60 is filled from about one-half to two-thirds with the acid containing solution, gas from the gas source is charged to the absorber 60 from the source 90. The gas is an ammonia containing gas and may contain almost any percent ammonia; however, gases from coking operations preferentially contain about 3% ammonia by volume. The ammonia containing gas charged to the absorber 60 is preheated to a temperature in the range of from about 100° to about 130°F., with a temperature of about 120°F. being preferred. Since the gases coming from a coking operation are at a temperature of about 120°F., the heater 90 is substantially used to maintain that temperature.

When the gases from the source 90 are charged to the absorber 60, both the pumps 72 and 82 are activated. As gas from the source 90 thereof flows upwardly through the absorber 60, it contacts the downwardly falling acid containing solution from both the sprays 65 and 75. Ammonia in the gas reacts with the sulfuric acid in the solution to produce ammonium sulfate. The bottom is in the absorber 60 flow outwardly therefrom through the outlet 70 and are split into two streams, one of which is recirculated to the sprays 75 by the pump 72. The other stream is transported to the suspension tank 80 by the pump 82. The ammonium sulfate containing solution in the suspension tank 80 overflows into the circulation tank 55 where additional sulfuric acid is added through the inlet 105 to make up the acid lost in the production of ammonium sulfate. Preferably, the sulfuric acid is added through the inlet 105 continuously at a rate sufficient to maintain the acid content of the solution at about 4.5% by weight.

As gas flows upwardly through the absorber 60 it exits through the gas outlet 95. Since the sulfuric acid containing solution absorbs only about 80% of the ammonia from the gas, some ammonia in the form of ammonium sulfate can condense on the gas outlet 95 and clog the outlet. To prevent the clogging and to clean the inside of the reactor which forms a scale from the ammonium sulfate produced, steam is added to the absorber 60 through an inlet 96. The steam serves two purposes, one being the cleaning of scale from the inside of the absorber 60 and the other being the heating of the gas leaving the absorber to prevent the buildup of ammonium sulfate in the gas outlet 95 thereby to prevent clogging of the same. An additional purpose of the steam is to provide additional water, thereby increasing the size of the batch of fertilizer concentrate produced. It will be appreciated, however, that other heaters or heating mediums beside steam may be used which would successfully perform either or both of the above enumerated functions.

In a preferred example of the present invention, 35,000 gallons of water are charged to the system 50 and sufficient concentrated sulfuric acid of 66 Baume is added to provide a solution containing about 4.5% acid. Both the pumps 62 and 82 have a capacity of about 210 gallons per minute, while the pump 72 has a capacity of about 2500 gallons per minute. It is seen, therefore, that the rate of liquid pumped to the spray 75 is greatly in excess of the liquid pumped to the spray 65. The ammonia containing gases from the source 90 is preheated to a temperature of about 120°F., while the stream entering the absorber 60 through the pipe 96 maintains the gas leaving the absorber at a temperature of about 120°F. Acid is added through the inlet 105 at a rate sufficient to maintain an acid concentration of about 4.5% by weight.

The process continues to operate for a period of about 24 hours, during which time an additional 1500 gallons of water is added from the steam used to heat the outlet gases. Accordingly, the final volume of fertilizer concentrate produced is about 5000 gallons.

During the 24 hours in which the process operates, about 11,000 pounds of sulfuric acid is added to the solution, while about 14 million cubic feet of gas from the source 90 flows through the absorber 60. The density of the ammonium sulfate containing solution flowing out of the absorber 60 through the outlet 70 is continuously monitored, although the monitoring may be on an hourly basis. As the weight percent of ammonium sulfate increases, the viscosity of the solution increases thereby presenting pumping problems. Additionally, if too much ammonium sulfate is produced, crystallization occurs and the resultant product is unsatisfactory for a fertilizer concentrate. Accordingly, it is of paramount importance that the ammonium sulfate remains in the solution as a liquid non-crystalline material. Viscosity is measured until the solution is between about 25 and about 28 Baume at 60°F. At this time the sulfuric acid make up is discontinued and the process continues for about 2 hours or until the acid remaining in the solution is at a level at less than about 1%.

Preferably, the viscosity of the solution is between about 26 and 28 Baume at 60°F., when the acid make up is discontinued and the process runs continuously for another 2 hours until the acid present in the solution is about 0.2% by weight or less. Successful fertilizer concentrates have been produced in which there is no free acid left in the solution and the solution is mildly alkaline. However, if the solution becomes too alkaline, the ammonium sulfate precipitates and the resultant solution is unsatisfactory.

While there has been described a process which is substantially a batch process, taking about 24 hours to complete, it will be appreciated that various modifications may be employed, if the equipment is available, to convert this process to a continuous process. The length of the process described is to a great extent dependent on the amount of ammonia present in the gas and this may vary substantially without detracting from the fundamental nature of the present invention.

Accordingly, it is seen that there has been provided a process for producing a liquid non-crystalline ammonium sulfate fertilizer concentrate. Additionally, other chemicals may be added to the concentrate to improve its usefulness as a fertilizer without detracting from the importance of the present invention.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A process for producing a liquid non-crystalline fertilizer concentrate, comprising providing a sulfuric acid solution wherein the sulfuric acid is present in a range of from about 1.5% to about 10% by weight, contacting said sulfuric acid solution with an ammonia containing gas to produce liquid non-crystalline ammonium sulfate, maintaining the sulfuric acid in the solution in the range of from about 1.5% to about 10% by weight until the viscosity of the solution is in the range of from about 25 to about 29 Baume at 60°F., and thereafter contacting the resultant liquid solution with an ammonia containing gas until the acid content is reduced to less than about 1% by weight to produce a liquid non-crystalline ammonium sulfuric fertilizer concentrate.

2. The process set forth in claim 1, wherein the sulfuric acid present in the solution is about 4.5% by weight.

3. The process set forth in claim 1, wherein sulfuric acid having a viscosity of 66 Baume at 60°F. is added to the solution to maintain the sulfuric acid content in the range of from about 1.5% to about 10% by weight.

4. The process set forth in claim 1, wherein the resultant liquid solution is contacted with an ammonia containing gas until the acid content is reduced to about 0.2% by weight.

5. The process set forth in claim 1, wherein the sulfuric acid solution is contacted with an ammonia containing gas in countercurrent relationship.

6. A process for producing a liquid non-crystalline fertilizer concentrate, comprising providing a sulfuric acid solution wherein the sulfuric acid is present in a range of from about 1.5% to about 10% by weight, contacting said sulfuric acid solution with an ammonia containing gas to produce liquid non-crystalline ammonium sulfate, maintaining the ammonia containing gas and the sulfuric acid solution in contact therewith at a temperature in the range of from about 100° to about 130°F, maintaining the sulfuric acid in the solution in the range of from about 1.5% to about 10% by weight until the viscosity of the solution is in the range of from about 25 to about 28 Baume at 60°F., and thereafter contacting the resultant liquid solution with an ammonia containing gas until the acid content is reduced to less than about 1% by weight to produce a liquid non-crystalline ammonium sulfuric fertilizer concentrate.

7. The process set forth in claim 6, wherein the ammonia containing gas and the sulfuric acid solution in contact therewith is maintained at a temperature of about 120°F.

8. The process set forth in claim 6, wherein the ammonia containing gas and the sulfuric acid solution in contact therewith is maintained at a temperature in the range of from about 100° to about 130°F., by adding steam thereto.

9. The process set forth in claim 6, wherein the ammonia containing gas is preheated to a temperature in the range of from about 100° to about 130°F.

10. A process for producing a liquid non-crystalline fertilizer concentrate, comprising providing a sulfuric acid solution wherein the sulfuric acid is present in a range of from about 1.5% to about 10% by weight, contacting said sulfuric acid solution with an ammonia containing gas to produce liquid non-crystalline ammonium sulfate, splitting the sulfuric acid solution containing liquid non-crystalline ammonium sulfate into a plurality of streams, continuously contacting one stream of the solution with the ammonia containing gas, maintaining the sulfuric acid content of another stream of the solution in the range of from about 1.5% to about 10% by weight until the viscosity of the solution is in the range of from about 25% to about 28 Baume at 60°F., and thereafter contacting the entire resultant liquid solution with an ammonia containing gas until the acid content is reduced to less than about 1% by weight to produce a liquid non-crystalline ammonium sulfuric fertilizer concentrate.

11. The process set forth in claim 10, wherein the sulfuric acid solution containing liquid non-crystalline ammonium sulfate is split into two streams.

12. The process set forth in claim 10, wherein the sulfuric acid solution is contacted with an ammonia containing gas in countercurrent relationship, and the one stream contacts the ammonia containing gas for a shorter period of time than another stream.

13. A liquid non-crystalline fertilizer concentrate, comprising a solution containing non-crystalline ammonium sulfate in the range of from about 36% by weight to about 42% by weight and having a viscosity in the range of from about 25 to about 28 Baume at 60°F., with an acid content of less than about 1% by weight.

14. The liquid non-crystalline fertilizer concentrate set forth in claim 13, wherein the acid content is about 0.2% by weight.

* * * * *